Figure 1:
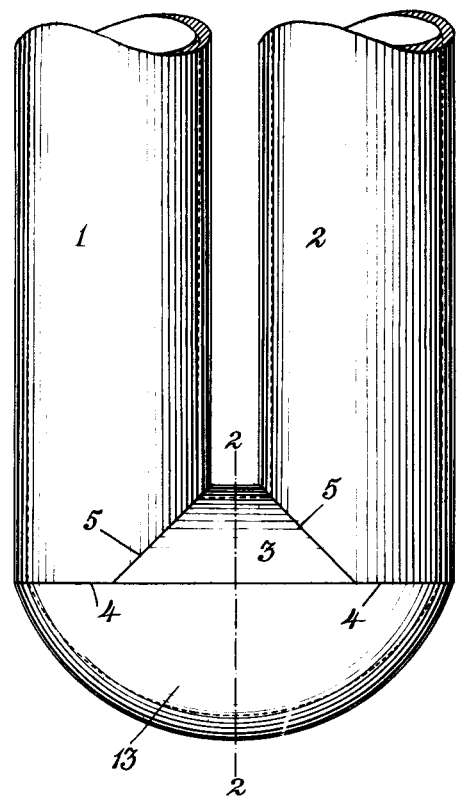

J. KINDERVATER.
METHOD OF MAKING U-SHAPED PIPE BENDS.
APPLICATION FILED JULY 8, 1914.

1,137,267.

Patented Apr. 27, 1915.

WITNESSES
George Du Bon

INVENTOR
Julius Kindervater
BY
ATTORNEYS

UNITED STATES PATENT OFFICE.

JULIUS KINDERVATER, OF RICHMOND, VIRGINIA, ASSIGNOR TO LOCOMOTIVE SUPER-HEATER COMPANY, OF NEW YORK, N. Y., A CORPORATION OF DELAWARE.

METHOD OF MAKING U-SHAPED PIPE-BENDS.

1,137,267.

Specification of Letters Patent.

Patented Apr. 27, 1915.

Application filed July 8, 1914. Serial No. 849,676.

*To all whom it may concern:*

Be it known that I, JULIUS KINDERVATER, a citizen of the United States, and a resident of Richmond, county of Henrico, State of Virginia, have invented a certain new and useful Improvement in Methods of Making U-Shaped Pipe-Bends, of which the following is a specification.

My invention concerns the making of U shaped pipe bends and particularly such bends when used in connection with boilers, superheaters and, generally, when exposed to high temperatures or used to carry steam or fluid under pressure. My invention may, however, be utilized to advantage in making pipe bends of the class referred to even though such pressure and temperature conditions are absent.

Various ways of making bends of the above character for similar purposes have been proposed.

The present invention comprises a method which, as contrasted with known methods, is of extreme simplicity, does not involve special tools or dies, can be carried out by comparatively unskilled workmen, and involves very little waste of material.

The object of my invention is to provide a pipe bend of the character specified which may be simply, easily and economically manufactured as aforesaid, which shall not involve any undue stretching, thinning, or straining of the pipe walls at any point, and which shall be adapted to withstand high pressures and temperatures when used under such high pressure and high temperature conditions.

My invention will be better understood by referring to the drawings, in which—

Figure 2:
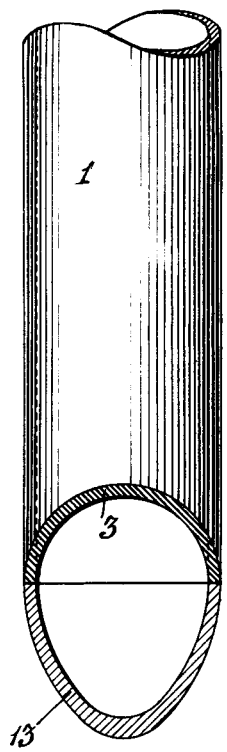
Figure 3:
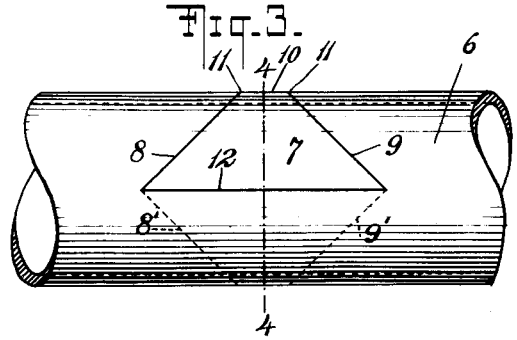
Figure 4:
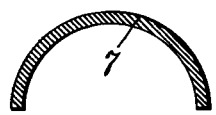

Figure 1 represents a plan view showing two pipes (broken away) united by a pipe made according to a preferred mode of carrying out my invention; Fig. 2 represents a central section taken along the line 2—2 of Fig. 1; Fig. 3 represents a plan view of a piece of pipe showing how the connecting members are formed; and Fig. 4 represents a section, taken along the line 4—4 of Fig. 3, through one of said connecting members.

Referring to the drawings, pipe lengths 1 and 2, which are to be united by the U shaped bend 3, have their ends independently squared off along planes 4, 4; each of said ends is also beveled off along a plane 5, which plane must intersect, at plane 4, an axial plane of the pipe length. From another piece of pipe 6, having the same diameter and wall thickness as pipes 1 and 2, is cut a connecting member 7. This member is preferably obtained by slitting the pipe from the side along two planes 8 and 9. These planes should include an angle of 90° and each plane should make an angle of 45° with the axis of the pipe. The slits extend to the center of the pipe (*i. e.*, to an axial plane). The distance 10, between the points 11 at which the slits enter the side of the pipe, determines the distance between adjacent walls of the pipe when the pipe bend is completed.

Slitting the pipe in the axial plane 12 to which the slits 8 and 9 extend will complete the formation of the connecting member 7. Instead of first slitting in the planes 8 and 9 and then slitting in the plane 12 the connecting member may be formed by first slitting in the plane 12 and then in the planes 8 and 9. In the claims the piece of pipe cut along the plane 12 is called a "half-pipe". A minimum of waste will occur if slits 8' and 9' corresponding to 8, 9 be made from the opposite side of the pipe, as shown in the drawing, thus providing material for two connecting members 7 which may then be separated from one another by slitting along the line 12.

The two pipe lengths, 1 and 2, are then placed parallel to one another with beveled portions adjacent and then the connecting member inserted between them with its edges abutting the beveled edges of the pipe ends; the pipe lengths 1 and 2 and pipe section 6 from which the connecting member 7 has been formed, all being of the same diameter and wall thickness, said edges will accurately abut, so that these edges may then be welded together in any desired manner, preferably electrically.

The pipe end is completed by applying a cap 13, preferably drop-forged. For use in superheaters, which is the use I have particularly contemplated in making this invention, I prefer the forging to be so done that the cap has a somewhat sharpened section across the plane of the pipe bend. The cap also should gradually increase in thickness or be reinforced, as it is commonly described toward its end. The cap may have any desired depth thus furnishing as great an internal cross-section at the bend as may be wished for.

Instead of beveling the pipe ends at 45° and so as to intersect the axial plane of the pipe at the open end of the pipe, the plane of the bevels may have any other desired angle. In such case, if said bevels intersect the axial plane of the pipe at the open end of the pipe the connecting member will be a "half pipe" cut from an elliptical sectioned pipe instead of from a pipe of circular section. If the bevels do not intersect the axial plane of the pipe at the open end of the pipe, then the connecting member will be, as before, cut from an elliptically sectioned pipe but its plane 12 will not be a central plane but a plane lying nearer the one extremity or the other of the major axis of the ellipse.

Having described my invention, I claim:

1. The method of making U-shaped pipe bends which comprises squaring and beveling off the ends of two pipes, providing a segment of pipe having ends beveled at angles corresponding to those of the bevels on the two pipes, inserting said segment between the two pipes, with its ends respectively abutting the beveled portions of said pipes, welding the edges of the pipe ends and segments together, and welding the edges of a cap to the remaining edges of the pipe ends and segments.

2. The method of making U-shaped pipe bends which comprises squaring and beveling off the ends of two pipes, so as to intersect the axial plane of the pipe in the open end of said pipe; providing a segment of half pipe having ends beveled at angles corresponding to those of the bevels on the two pipes, inserting said segment between the two pipes, with its ends respectively abutting the beveled portions of said pipes, welding the edges of the pipe ends and segments together, and welding the edges of a cap to the remaining edges of the pipe ends and segments.

3. The method of making U-shaped pipe bends which comprises squaring and beveling off the ends of two pipes each bevel being at 45° with an axial plane which it intersects at the open end of the pipe, providing a segment of half pipe of the same diameter and wall thickness as the two pipes and having similar and symmetric ends beveled at the same angle as are the two pipes, inserting said segment between the two pipes with its ends respectively abutting the beveled portions of said pipes, welding the edges of pipe ends and segment together, and welding the edges of a cap to the remaining edges of the pipe ends and segment.

In testimony whereof I have hereunto set my hand in the presence of two subscribing witnesses.

JULIUS KINDERVATER.

Witnesses:
  JNO. S. AGNEW,
  L. E. DINGMAN.